(12) United States Patent
Snapp et al.

(10) Patent No.: US 8,095,108 B2
(45) Date of Patent: Jan. 10, 2012

(54) SYSTEM AND METHOD FOR HANDLING MOBILE EMERGENCY SERVICE CALL FROM AN INCOGNITO MOBILE STATION

(75) Inventors: John Lawrence Snapp, Westminster, CO (US); Robin Erkkila, Lafayette, CO (US)

(73) Assignee: West Corporation, Omaha, NE (US)

( * ) Notice: Subject to any disclaimer, the term of this patent is extended or adjusted under 35 U.S.C. 154(b) by 585 days.

(21) Appl. No.: 12/247,454

(22) Filed: Oct. 8, 2008

(65) Prior Publication Data

US 2010/0087160 A1    Apr. 8, 2010

(51) Int. Cl.
*H04M 1/00* (2006.01)
(52) U.S. Cl. .................. 455/404.1; 455/414.1
(58) Field of Classification Search ............... 455/404.1
See application file for complete search history.

(56) References Cited

U.S. PATENT DOCUMENTS

| | | | |
|---|---|---|---|
| 5,815,808 A | 9/1998 | Valentine | |
| 6,622,016 B1 | 9/2003 | Sladek et al. | |
| 6,868,410 B2 | 3/2005 | Fortin et al. | |
| 7,313,825 B2 | 12/2007 | Redlich et al. | |
| 7,317,927 B2 | 1/2008 | Staton et al. | |
| 7,447,765 B2 * | 11/2008 | Aerrabotu et al. | 709/224 |
| 7,565,130 B2 * | 7/2009 | Chin et al. | 455/404.1 |
| 7,623,842 B2 * | 11/2009 | Levitan | 455/404.2 |
| 2006/0189303 A1 * | 8/2006 | Rollender | 455/417 |
| 2007/0055684 A1 | 3/2007 | Stevens | |
| 2008/0057919 A1 | 3/2008 | Choi-Grogan et al. | |

OTHER PUBLICATIONS

Webre, Patrick, "FCC Takes Steps to Improve the Ability of Public Safety Agencies to Assist Wireless Callers Using Non-Service-Initialized Phones", Unofficial Announcement of the Federal Communications Commission, Apr. 29, 2002.

* cited by examiner

*Primary Examiner* — Kamran Afshar
*Assistant Examiner* — Kenneth Corbin

(57) ABSTRACT

A system for handling a mobile emergency service call originating from an incognito mobile station operating in a mobile telecommunication network includes a mobile positioning center coupled with the mobile telecommunication network; an incognito call handling center coupled with the mobile telecommunication network; and an incognito phone data base coupled with the mobile positioning center. The mobile positioning center queries the incognito phone data base to ascertain handling instructions for the mobile emergency service call when the mobile telecommunication network fails to provide a call back number for the incognito mobile station to the mobile positioning center. The incognito phone data base, the mobile positioning center, the mobile telecommunication network and the incognito call handling center cooperate to effect routing of the mobile emergency service call substantially according to the handling instructions.

20 Claims, 4 Drawing Sheets

SYSTEM AND METHOD FOR HANDLING MOBILE EMERGENCY SERVICE CALL FROM AN INCOGNITO MOBILE STATION

FIELD OF THE INVENTION

The present invention is directed to emergency service telecommunication systems, and especially to interaction between an incognito mobile station and an emergency service telecommunication system.

BACKGROUND OF THE INVENTION

Users of mobile telephones or other wireless communication devices including, by way of example and not by way of limitation, Personal Digital Assistant (PDA) devices, "Smart" phones, automatic crash notification (ACN) units, mobile radio devices and similar communication devices may employ "incognito mobile stations" in carrying out their calling activities. For purposes of this disclosure, the term "incognito mobile station" is intended to include any mobile station, mobile telephone or other wireless communication device that is not registered for service with any Commercial Mobile Radio Service (CMRS) carrier. Incognito mobile stations may also include, by way of example and not by way of limitation, Non-Service-Initiated (NSI; sometimes referred to as Non-Service-Initialized) phones.

Examples of special number calls are 9-1-1 calls for seeking emergency services (sometimes referred to as emergency service calls) and other abbreviated number calls for non-emergency special services, such as "N-1-1" systems. Examples of such N-1-1 systems include "3-1-1" (urgent but not emergency calls) and "5-1-1" (traffic inquiry calls). Special number calls may also include, by way of further example and not by way of limitation, abbreviated numbers for calling commercial services, such as "*820" (calling a radio station) or "GOTIX" (calling for tickets).

For purposes of illustration, by way of example and not by way of limitation, the present invention will be described in the context of an emergency service network in the United States, commonly referred to as a 9-1-1 network. The teachings of the present invention are equally applicable, useful and novel in other special number calling systems, such as maintenance service networks, college campus security networks, abbreviated number networks for calling commercial services and other networks.

CMRS carriers generally assign a dial-able number to a mobile station when a customer enters into a service contract. Because no such dial-able number is assigned to an incognito mobile station, a problem may arise when using an incognito mobile station for placing an emergency service call. Having no assigned dial-able number means that an emergency service call handling center will be unable to call back an emergency service caller who is disconnected when that caller is using an incognito mobile station. By way of example and not by way of limitation an emergency service call handling center may be embodied in a Public Safety Answering Point (PSAP; sometimes referred to as a Public Safety Answering Position). Examples of incognito phones include, by way of example and not by way of limitation, "9-1-1 Only" phones as well as unsubscribed cellular phones distributed by donation programs to at-need individuals such as victims of domestic violence.

Prior solutions effectively amounted to alerting parties involved in an emergency service call placed using an incognito mobile station that no call back number is available. Essentially, earlier solutions provided for "living with it" and not affording any system or method for providing a call back number for an emergency service call handling center. This "live with it" approach was essentially set forth in a Federal Communications Commission (FCC) News Release of Apr. 29, 2002. The alerting was to be effected by programming incognito phones with a code 123-456-7890 as a "telephone number" to alert an emergency service call handling center such as a PSAP that the 9-1-1 call is being made from a wireless phone that lacks a call-back capability. The FCC also required that incognito phones be labeled to alert a user to the lack of call-back capability.

Such an "all or nothing" approach to call handling for incognito phones may unnecessarily obviate providing a call-back capability for some incognito phones by pre-identifying incognito phones and providing routing instructions for the registered incognito phones. At least incognito phones that are registered and provide routing information including a contact number for call-back, such as a land line number of a relative or friend, could be provided a pseudo call-back capability that may prove to be better than no call-back capability at all.

There is a need for a system and method for handling mobile emergency service calls from incognito mobile stations that can route at least some such calls to an emergency service call handling center accompanied by routing information relating to handling emergency service calls received from the calling incognito mobile station.

There is a need for a system and method for handling mobile emergency service calls from incognito mobile stations that can route at least some such calls to an emergency service call handling center accompanied by information providing at least a pseudo call-back capability for a calling incognito mobile station.

SUMMARY OF THE INVENTION

A system for handling a mobile emergency service call originating from an incognito mobile station operating in a mobile telecommunication network includes a mobile positioning center coupled with the mobile telecommunication network; an incognito call handling center coupled with the mobile telecommunication network; and an incognito phone data base coupled with the mobile positioning center. The mobile positioning center queries the incognito phone data base to ascertain handling instructions for the mobile emergency service call when the mobile telecommunication network fails to provide a call back number for the incognito mobile station to the mobile positioning center. The incognito phone data base, the mobile positioning center, the mobile telecommunication network and the incognito call handling center cooperate to effect routing of the mobile emergency service call substantially according to the handling instructions.

A method for handling a mobile emergency service call originating from an incognito mobile station operating in a mobile telecommunication network, a mobile positioning center and an incognito call handling center being coupled with the mobile telecommunication network and an incognito phone data base being coupled with the mobile positioning center, includes: (a) operating the mobile positioning center to query the incognito phone data base to ascertain handling instructions for the mobile emergency service call when the mobile telecommunication network fails to provide a call back number for the incognito mobile station to the mobile positioning center; and (b) operating the incognito phone data base, the mobile positioning center, the mobile telecommunication network and the incognito call handling center cooperatively to effect routing of the mobile emergency service call substantially according to the handling instructions.

It is, therefore, a feature of the present invention to provide a system and method for handling mobile emergency service calls from incognito mobile stations that can route at least some such calls to an emergency service call handling center accompanied by information relating to handling emergency service calls received from the calling incognito mobile station.

It is also a feature of the present invention to provide a system and method for handling mobile emergency service calls from incognito mobile stations that can route at least some such calls to an emergency service call handling center accompanied by information providing at least a partial call-back capability for a calling incognito mobile station.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
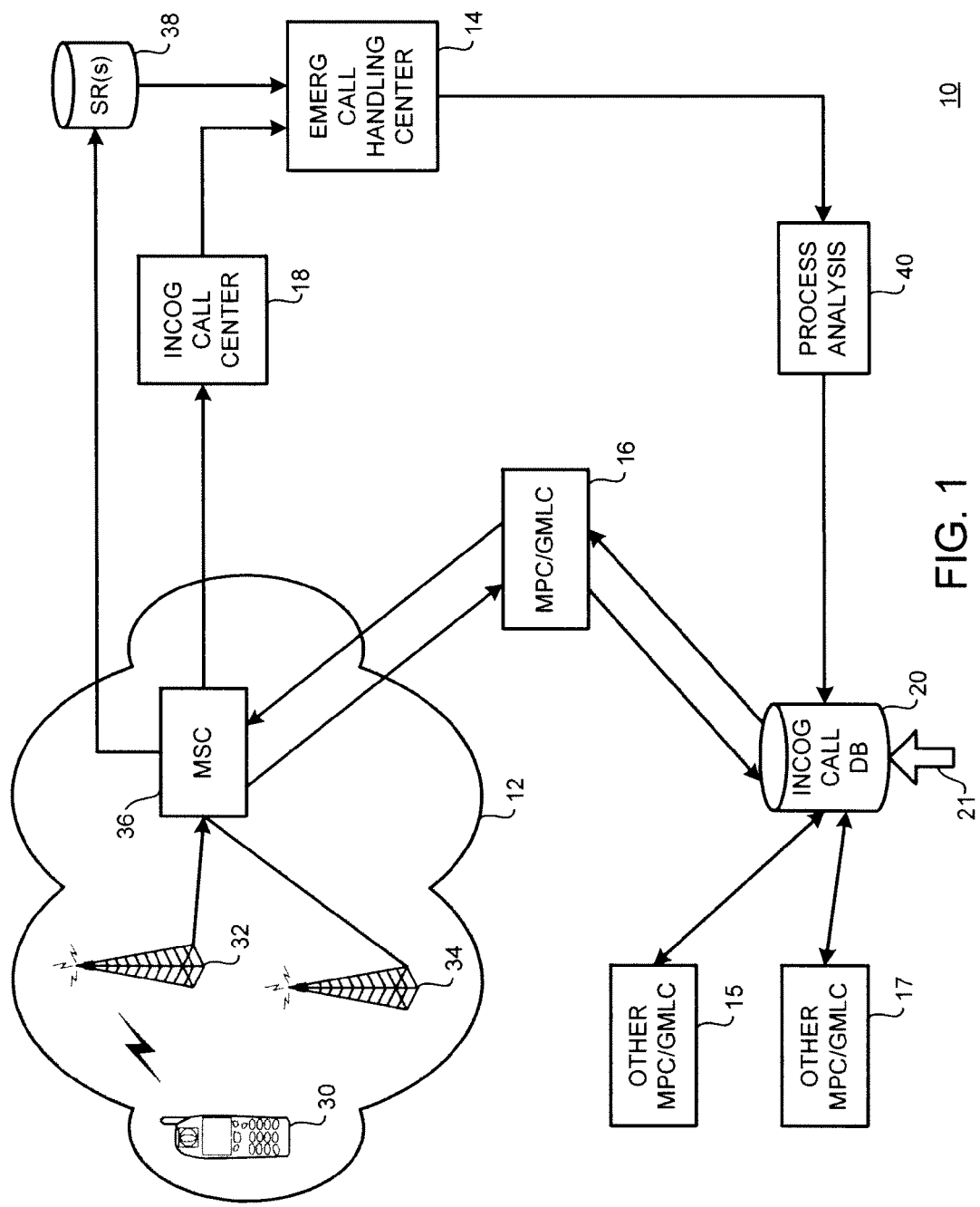
FIG. 1 is a schematic diagram illustrating an emergency service telecommunication system configured according to the teachings of the present invention.

FIG. 1 is a schematic diagram illustrating an emergency service telecommunication system configured according to the teachings of the present invention. In FIG. 1, an emergency service telecommunication system 10 includes a mobile telecommunication network 12, an emergency call handling center 14, a mobile positioning unit 16, an incognito call handling center or unit 18 and an incognito call data base or unit 20. Emergency call handling center 14 may be embodied, by way of example and not by way of limitation, in a Public Safety Answering Point (PSAP; sometimes referred to as a Public Safety Answering Position). Mobile positioning unit 16 may be embodied, by way of example and not by way of limitation, in a Mobile Positioning Center (MPC) as in a cellular telecommunication system, or in a Gateway Mobile Location Center (GMLC) as in a GSM (Group Speciale Mobile, or Global System for Mobile communications) telecommunication system.

Mobile telecommunication network 12 includes a mobile station 30 in communication with at least one telecommunication tower 32, 34. Mobile telecommunication network 12 also includes a Mobile Switching Center (MSC) 36. MSC 36 effects communications with stations or entities outside mobile telecommunication network 12 such as with MPC 16 and emergency call handling center 14. Calls between MSC 36 and emergency call handling center 14 may be routed via one or more Selective Router (SR) 38. When handling a call placed from an incognito mobile station 30, call routing between MSC 36 and emergency call handling center 14 may be routed via incognito call handling unit 18, as will be described in greater detail in connection with FIG. 2.

A process analysis unit 40 may be coupled with emergency call handling center 14 and incognito call data base or unit 20. If emergency call handling center 14 ascertains that an extant call may be received from an incognito mobile station 30, information relating to the extant call may be provided to process analysis unit 40 for evaluation. If the extant call is determined to be received from an incognito mobile station 30, information relating to the incognito mobile station 30 may be provided to incognito call data base 20 for use in later instances of 9-1-1 calls being received from incognito mobile station 30.

Incognito data base 20 stores information such as, by way of example and not by way of limitation, routing information or information relating to a pseudo call-back arrangement or capability relating to an incognito mobile station 30. Incognito data base 20 may receive information for storage from process analysis unit 40, via an update port represented by an arrow 21 (described in greater detail in connection with FIG. 3). Update port 21 may be provided to any of one or several units in telecommunication system 10 (not shown in FIG. 1), as will be understood by those skilled in the art of telecommunication system design. Incognito data base 20 may also be coupled with other MPCs 15, 17. Other MPCs 15, 17 may be associated, by way of example and not by way of limitation, with other mobile telecommunication networks (not shown in FIG. 1).

Figure 2:
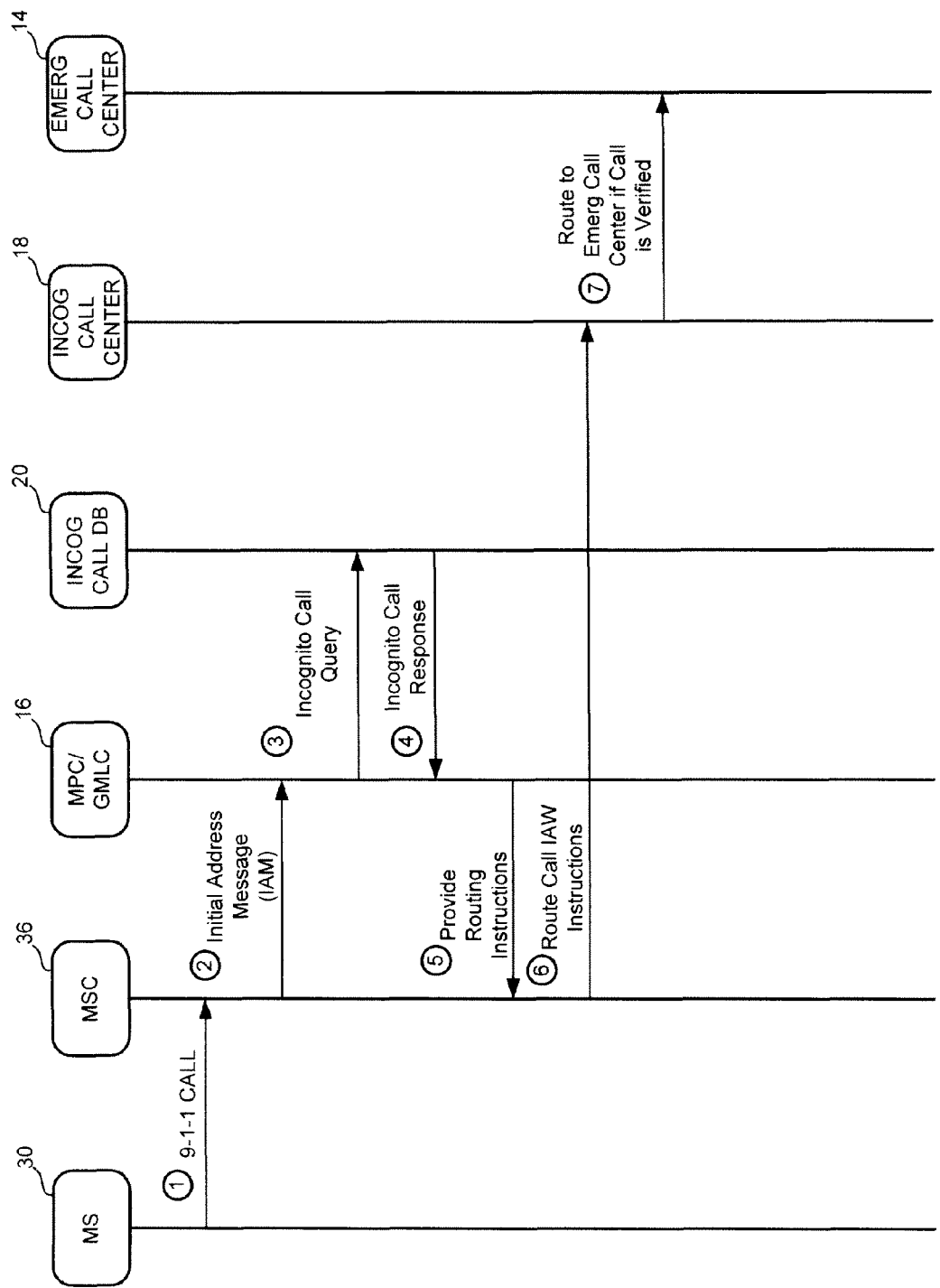
FIG. 2 is a schematic illustration of a representative call flow for effecting operation of the present invention.

FIG. 2 is a schematic illustration of a representative call flow for effecting operation of the present invention. In FIG. 2, call flows are represented among (referring to components described in connection with FIG. 1) MS 30, MSC 36, MPC 16, incognito call data base 20, incognito call handling center 18 and emergency call handling center 14. Note: in the following flows some Acknowledgements (ACKS) may have been omitted as will be understood by those skilled in the art of communication network design.

FIG. 2 illustrates call flow as follows:
1. Mobile Station 30 places an emergency service (9-1-1) call.
2. MSC 36 sends the call to MPC 16. In a GSM (Group Speciale Mobile; or Global System for Mobile communications) communication system, call #2 may be in the format of an ISUP IAM (ISDN User Part Initial Address Message) message. In a next generation GSM communication system, call #2 may be in the format of a SLR (Subscriber Location Request) message. In a CDMA (Code Division Multiple Access) communication system, call #2 may be in the format of an ORREQ (ORigination REQuest) message. If MSC 36 does not know the callback number of MS 30, MSC 36 may place "911+ last 7 digits of the equipment serial number" as a substitute call back number. In a CDMA communication system the equipment serial number is the ESN (Electronic Serial Number) of MS 30. In CDMA communication systems MSC 36 will also place the ESN in the ORREQ for all calls. In a GSM communication system the equipment serial number is the IMEI (International Mobile Equipment Identity) of MS 30. (ESN for CDMA and for GSM).

3. MPC 16 will query incognito call data base 20. Incognito data base 20 is a database that is pre-provisioned with a list of incognito devices for which specific action should be taken in handling an emergency service 9-1-1 call. MPC 36 will send to incognito data base 20 any identification that MSC 36 may have including, by way of example and not by way of limitation MIN (Mobile Identification Number), MDN (Mobile Directory Number), ESN, IMEI, technology employed (e.g., type of communication system), and PSAP 14 to which the call should be routed.

4. Incognito call data base 20 will return what should be done with the extant call. Information returned may include OK (i.e., route the call to the identified PSAP 14), BLOCK (i.e., deny routing the call further), route the call to incognito call handling center 18 or another disposition for the extant call.

5. Routing instructions are returned to MSC 36 appropriate to effect the instructional information received from incognito call data base 20 during call #4.

6. The extant call will be routed based upon the information returned by incognito call database 20. By way of example and nor by way of limitation, such routing may direct the extant call directly to PSAP 14, to a incognito call center 18 or to an IVRU (Interactive Voice Response Unit; not shown in FIG. 2). An IVRU may be located in any of several units illustrated in FIG. 2 or in another unit not illustrated in FIG. 2, as will be understood by those skilled in the art of telecommunication system design.

7. The extant call may be verified by incognito call handling center 18 to be a valid 9-1-1 call from an identified mobile station 30, and the extant call may be forwarded to PSAP 14.

Figure 3:
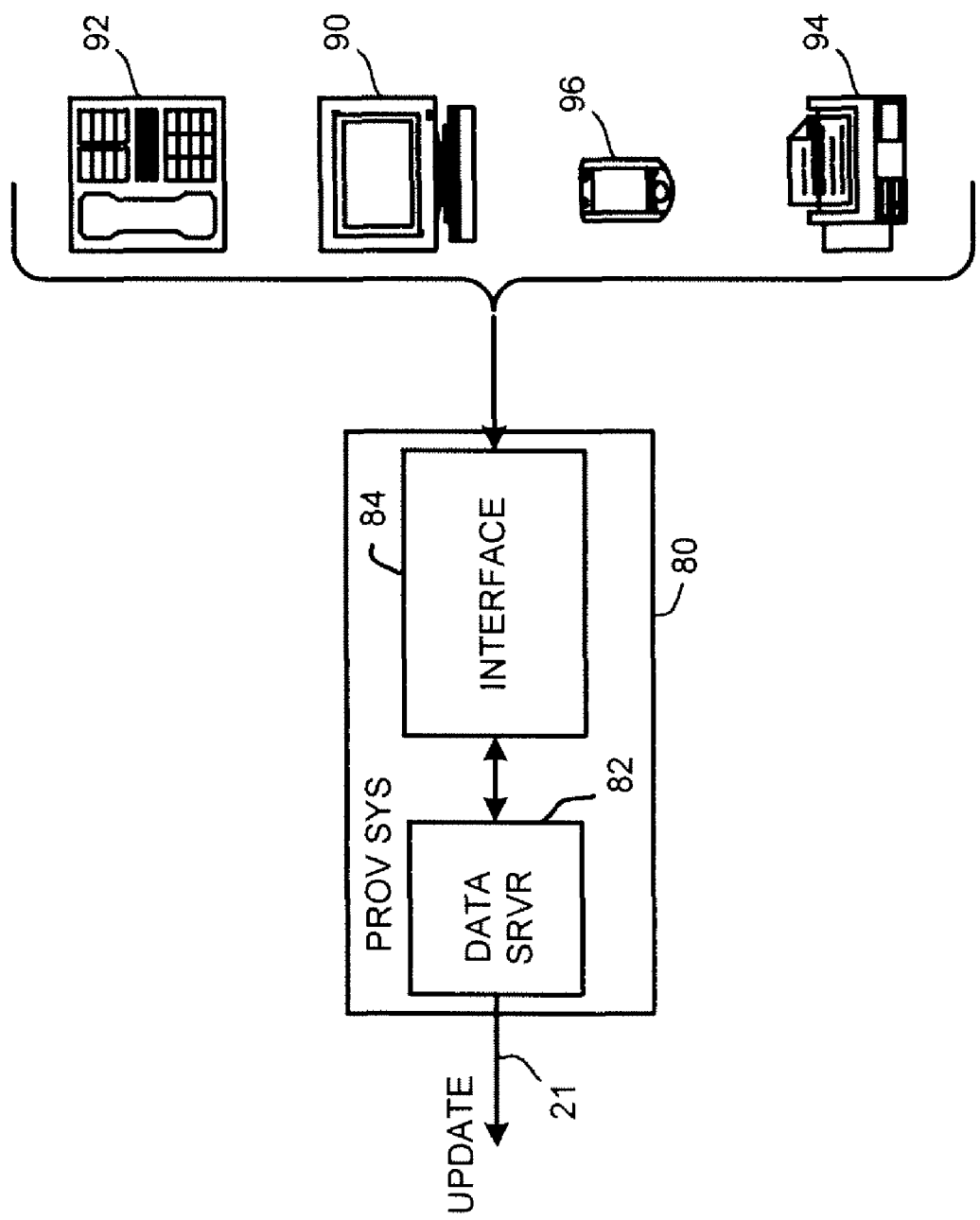
FIG. 3 is a schematic diagram of a representative system for effecting registration of an incognito mobile station with the emergency service telecommunication system of the present invention.

FIG. 3 is a schematic diagram of a representative system for effecting registration of an incognito mobile station with the emergency service telecommunication system of the present invention. In FIG. 3, a provisioning system 80 is configured for updating information in emergency service telecommunication system 10 (FIG. 1). Provisioning system 80 includes a data server unit 82 coupled with an interface unit 84.

Provisioning system 80 is coupled with a communications or update port 21 associated with telecommunication system 10 (FIG. 1). Incognito call data base 20 (FIG. 1) can be updated for telecommunication system 10 based on parameters set up by a home or business subscriber and submitted to provisioning system 80 via interface unit 84 by any of various technologies known to those skilled in the art of telecommunication system design including, by way of example and not by way of limitation, a computer 90, a phone 92, a facsimile machine 94 and a PDA (Personal Digital Assistant) 96 or another communication device such as, by way of example and not by way of limitation, a smart phone (not shown in FIG. 3).

Figure 4:
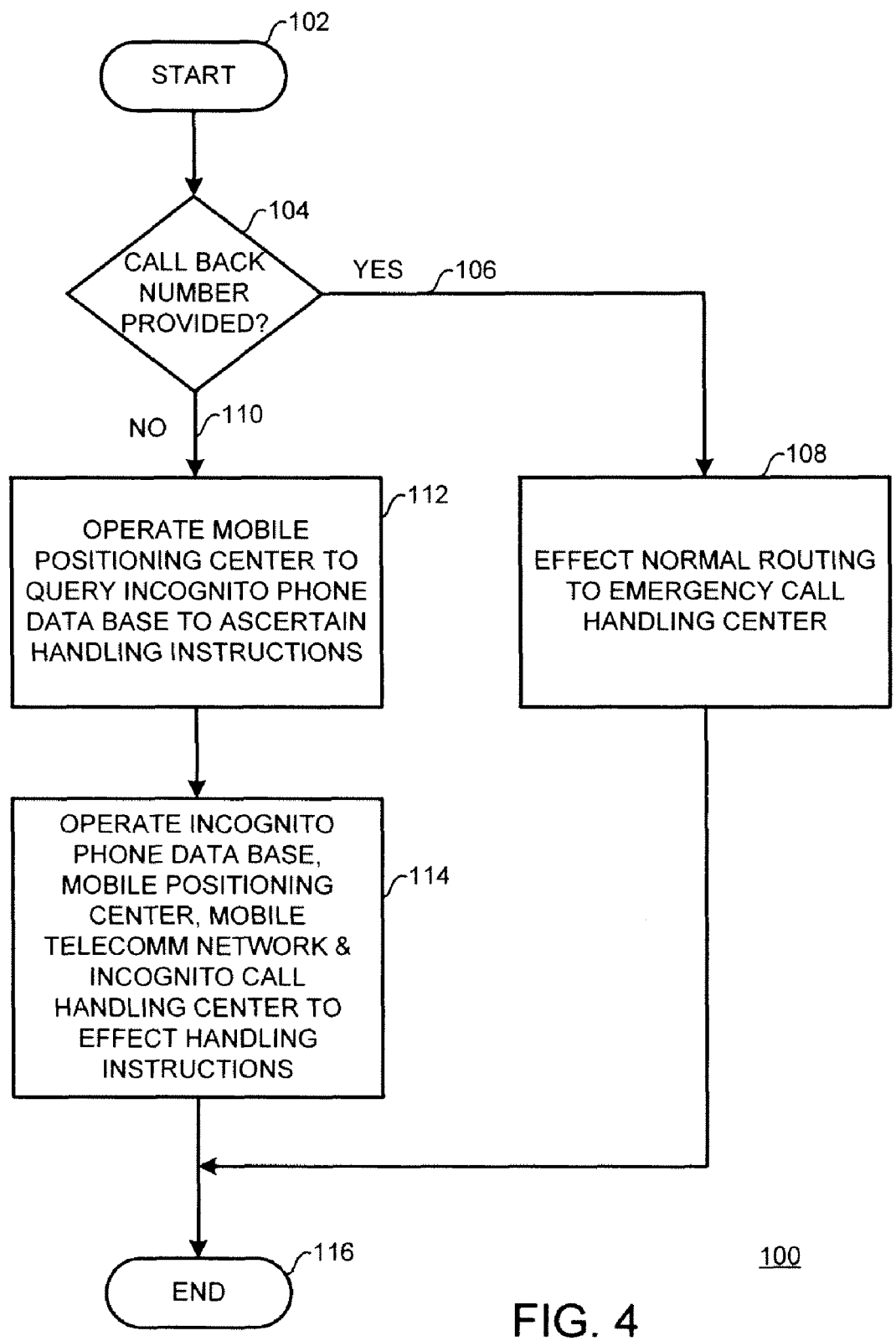
FIG. 4 is flow diagram illustrating the method of the present invention.

FIG. 4 is flow diagram illustrating the method of the present invention. In FIG. 4, a method 100 for handling a mobile emergency service call originating from an icognito mobile station operating in a mobile telecommunication network begins at a START locus 102. A mobile positioning center and an incognito call handling center are coupled with the mobile telecommunication network. An incognito phone data base is coupled with the mobile positioning center.

Method 100 continues with posing a query whether a call back number is provided for the calling mobile station, as indicated by a query block 104. If a call back number is provided for the calling mobile station, method 100 continues via a YES response line 106 and normal routing and handling is effected with regard to the extant call, as indicated by a block 108.

If a call back number is not provided for the calling mobile station, method 100 continues via a NO response line 110 and the mobile positioning center operates to query the incognito phone data base to ascertain handling instructions for the extant mobile emergency service call, as indicated by a block 112.

Method 100 continues with operating the incognito phone data base, the mobile positioning center, the mobile telecommunication network and the incognito call handling center cooperatively to effect routing of the mobile emergency service call substantially according to the handling instructions, as indicated by a block 114. Method 100 terminates at an END locus 116.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for handling a non-service-initiated mobile emergency service call bound for an emergency call handling center; said non-service-initiated mobile emergency service call originating from a transmitting mobile station operating in a mobile telecommunication network; a first mobile positioning unit being coupled with said mobile telecommunication network; said first mobile positioning unit being configured for ascertaining loci of mobile stations operating in said mobile telecommunication network; the system comprising:

(a) a non-service-initiated call handling center coupled with said mobile telecommunication network and with said emergency call handling center; and (b) a non-service-initiated data base coupled with said first mobile positioning unit; said non-service-initiated database containing information including a list of a plurality of registered non-service-initiated mobile devices and specific action which should be followed when each respective registered non-service-initiated mobile device of said plurality of registered non-service-initiated mobile devices is involved in an emergency service call; registration of said plurality of registered non-service-initiated mobile devices being effected for inclusion in said information via a registration process independent of said transmitting mobile station originating said non-service-initiated mobile emergency service call; said first mobile positioning unit querying said non-service-initiated data base to ascertain handling instructions for said mobile emergency service call when said mobile telecommunication network fails to provide a call back number for said transmitting mobile station to said first mobile positioning unit; said non-service-initiated data base, said first mobile positioning unit, said mobile telecommunication network and said non-service-initiated call handling center cooperating to effect routing of said mobile emergency service call substantially according to said handling instructions.

2. A system for handling a non-service-initiated mobile emergency service call bound for an emergency call handling center as recited in claim 1 wherein said non-service-initiated data base is also coupled with at least one second mobile positioning unit.

3. A system for handling a non-service-initiated mobile emergency service call bound for an emergency call handling center as recited in claim 1 wherein the system further comprises an analysis unit coupled with said emergency call handling center and with said non-service-initiated data base; said emergency call handling center and said non-service-initiated analysis unit cooperating to store information in said non-service-initiated data base relating to non-service-initiated emergency service calls identified by said emergency call handling center.

4. A system for handling a non-service-initiated mobile emergency service call bound for an emergency call handling center as recited in claim 1 wherein said mobile telecommunication network includes a mobile switching center; said non-service-initiated call handling center and said first mobile positioning unit being coupled with said mobile switching center.

5. A system for handling a non-service-initiated mobile emergency service call bound for an emergency call handling center as recited in claim 2 wherein the system further comprises an analysis unit coupled with said emergency call handling center and with said non-service-initiated data base; said emergency call handling center and said non-service-initiated analysis unit cooperating to store information in said non-service-initiated data base relating to non-service-initiated emergency service calls identified by said emergency call handling center.

6. A system for handling a non-service-initiated mobile emergency service call bound for an emergency call handling center as recited in claim 2 wherein said mobile telecommunication network includes a mobile switching center; said non-service-initiated call handling center and said first mobile positioning unit being coupled with said mobile switching center.

7. A system for handling a non-service-initiated mobile emergency service call bound for an emergency call handling center as recited in claim 3 wherein said mobile telecommunication network includes a mobile switching center; said non-service-initiated call handling center and said first mobile positioning unit being coupled with said mobile switching center.

8. A system for handling a mobile emergency service call originating from an incognito mobile station operating in a mobile telecommunication network; a mobile positioning center being coupled with said mobile telecommunication network; the system comprising:
(a) an incognito call handling center coupled with said mobile telecommunication network; and
(b) an incognito phone data base coupled with said mobile positioning center; said incognito phone database containing information including a list of a plurality of registered incognito mobile stations and specific action which should be followed when each respective registered incognito mobile station of said plurality of registered incognito mobile stations is involved in an emergency service call; registration of said plurality of registered incognito mobile stations being effected for inclusion in said information via a registration process independent of said incognito mobile station originating said mobile emergency service call; said mobile positioning center querying said incognito phone data base to ascertain handling instructions for said mobile emergency service call when said mobile telecommunication network fails to provide a call back number for said incognito mobile station to said mobile positioning center; said incognito phone data base, said mobile positioning center, said mobile telecommunication network and said incognito call handling center cooperating to effect routing of said mobile emergency service call substantially according to said handling instructions.

9. A system for handling a mobile emergency service call originating from an incognito mobile station operating in a mobile telecommunication network as recited in claim 8 wherein said incognito phone data base is also coupled with at least one additional mobile positioning center.

10. A system for handling a mobile emergency service call originating from an incognito mobile station operating in a mobile telecommunication network as recited in claim 8 wherein the system further comprises an analysis unit coupled with an emergency call handling center and with said incognito phone data base; said emergency call handling center and said incognito phone analysis unit cooperating to store information in said incognito phone data base relating to incognito emergency service calls identified by said emergency call handling center.

11. A system for handling a mobile emergency service call originating from an incognito mobile station operating in a mobile telecommunication network as recited in claim 8 wherein said mobile telecommunication network includes a mobile switching center; said incognito call handling center and said mobile positioning center being coupled with said mobile switching center.

12. A system for handling a mobile emergency service call originating from an incognito mobile station operating in a mobile telecommunication network as recited in claim 9 wherein the system further comprises an analysis unit coupled with an emergency call handling center and with said incognito phone data base; said emergency call handling center and said incognito phone analysis unit cooperating to store information in said incognito phone data base relating to incognito emergency service calls identified by said emergency call handling center.

13. A system for handling a mobile emergency service call originating from an incognito mobile station operating in a mobile telecommunication network as recited in claim 9 wherein said mobile telecommunication network includes a mobile switching center; said incognito call handling center and said mobile positioning unit being coupled with said mobile switching center.

14. A system for handling a mobile emergency service call originating from an incognito mobile station operating in a mobile telecommunication network as recited in claim 10 wherein said mobile telecommunication network includes a mobile switching center; said incognito call handling center and said mobile positioning unit being coupled with said mobile switching center.

15. A method for handling a mobile emergency service call originating from an incognito mobile station operating in a mobile telecommunication network; a mobile positioning center and an incognito call handling center being coupled with said mobile telecommunication network; an incognito phone data base being coupled with said mobile positioning center; the method comprising:
  (a) populating said incognito phone database with information including a list of a plurality of registered incognito mobile stations and specific action which should be followed when each respective registered incognito mobile station of said plurality of registered incognito mobile stations is involved in an emergency service call; registration of said plurality of registered incognito mobile stations being effected for inclusion in said information via a registration process independent of said incognito mobile station originating said mobile emergency service call;
  (b) operating said mobile positioning center to query said incognito phone database to ascertain handling instructions for said mobile emergency service call when said mobile telecommunication network fails to provide a call back number for said incognito mobile station to said mobile positioning center; and
  (c) operating said incognito phone data base, said mobile positioning center, said mobile telecommunication network and said incognito call handling center cooperatively to effect routing of said mobile emergency service call substantially according to said handling instructions.

16. A method for handling a mobile emergency service call originating from an incognito mobile station operating in a mobile telecommunication network as recited in claim 15 wherein said incognito phone data base is also coupled with at least one additional mobile positioning center.

17. A method for handling a mobile emergency service call originating from an incognito mobile station operating in a mobile telecommunication network as recited in claim 15 wherein the system further comprises an analysis unit coupled with an emergency call handling center and with said incognito phone data base; said emergency call handling center and said incognito phone analysis unit cooperating to store information in said incognito phone data base relating to incognito emergency service calls identified by said emergency call handling center.

18. A method for handling a mobile emergency service call originating from an incognito mobile station operating in a mobile telecommunication network as recited in claim 15 wherein said mobile telecommunication network includes a mobile switching center; said incognito call handling center and said mobile positioning center being coupled with said mobile switching center.

19. A method for handling a mobile emergency service call originating from an incognito mobile station operating in a mobile telecommunication network as recited in claim 16 wherein the system further comprises an analysis unit coupled with an emergency call handling center and with said incognito phone data base; said emergency call handling center and said incognito phone analysis unit cooperating to store information in said incognito phone data base relating to incognito emergency service calls identified by said emergency call handling center.

20. A method for handling a mobile emergency service call originating from an incognito mobile station operating in a mobile telecommunication network as recited in claim 16 wherein said mobile telecommunication network includes a mobile switching center; said incognito call handling center and said mobile positioning unit being coupled with said mobile switching center.

* * * * *